United States Patent
Khandelwal et al.

(10) Patent No.: US 12,001,794 B2
(45) Date of Patent: Jun. 4, 2024

(54) ZERO-SHOT ENTITY LINKING BASED ON SYMBOLIC INFORMATION

(71) Applicant: International Business Machines Corporation, Armonk, NY (US)

(72) Inventors: Dinesh Khandelwal, Indore (IN); G P Shrivatsa Bhargav, Bengaluru (IN); Saswati Dana, Bangalore (IN); Dinesh Garg, Beawar (IN); Pavan Kapanipathi Bangalore, Westchester, NY (US); Salim Roukos, Redondo Beach, CA (US); Alexander Gray, Yonkers, NY (US); L. Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 17/575,951

(22) Filed: Jan. 14, 2022

(65) Prior Publication Data
US 2023/0229859 A1 Jul. 20, 2023

(51) Int. Cl.
*G06F 40/279* (2020.01)
*G06N 5/02* (2023.01)

(52) U.S. Cl.
CPC ........... *G06F 40/279* (2020.01); *G06N 5/027* (2013.01)

(58) Field of Classification Search
CPC .............................. G06F 40/279; G06N 5/027
See application file for complete search history.

(56) References Cited

U.S. PATENT DOCUMENTS

| 11,042,922 | B2 | 6/2021 | Onoro Rubio et al. |
| 2021/0326531 | A1* | 10/2021 | Kumar ............... G06F 16/3344 |
| 2022/0253477 | A1* | 8/2022 | Lipka .................... G06N 20/00 |

FOREIGN PATENT DOCUMENTS

| KR | 2021004572 A | 4/2021 |
| KR | 20210045728 A | 4/2021 |

OTHER PUBLICATIONS

Banerjee, D.; Chaudhuri, D.; Dubey, M.; and Lehmann, J. 2020. PNEL: Pointer Network Based End-To-End Entity Linking over Knowledge Graphs. In ISWC, 21-38.
Cao, N. D.; Izacard, G.; Riedel, S.; and Petroni, F. 2021. Autoregressive Entity Retrieval. In ICLR.
(Continued)

*Primary Examiner* — Ibrahim Siddo
(74) *Attorney, Agent, or Firm* — Ryan, Mason & Lewis, LLP

(57) ABSTRACT

Methods, systems, and computer program products for zero-shot entity linking based on symbolic information are provided herein. A computer-implemented method includes obtaining a knowledge graph comprising a set of entities and a training dataset comprising text samples for at least a subset of the entities in the knowledge graph; training a machine learning model to map an entity mention substring of a given sample of text to one corresponding entity in the set of entities, wherein the machine learning model is trained using a multi-task machine learning framework using symbolic information extracted from the knowledge graph; and mapping an entity mention substring of a new sample of text to one of the entities in the set using the trained machine learning model.

20 Claims, 9 Drawing Sheets

(56) References Cited

OTHER PUBLICATIONS

Caruana, R. 1995. Learning Many Related Tasks at the Same Time with Backpropagation. In NeurIPS, 657-664.
Chen, A.; Gudipati, P.; Longpre, S.; Ling, X.; and Singh, S. 2021. Evaluating Entity Disambiguation and the Role of Popularity in Retrieval-Based NLP. In ACL, 4472-4485.
Chen, Q.; Zhu, X.; Ling, Z.-H.; Inkpen, D.; and Wei, S. 2018. Neural Natural Language Inference Models Enhanced with External Knowledge. In ACL, 2406-2417.
Chen, S.;Wang, J.; Jiang, F.; and Lin, C.-Y. 2020. Improving Entity Linking by Modeling Latent Entity Type Information. In AAAI, 7529-7537.
Chisholm, A.; and Hachey, B. 2015. Entity Disambiguation with Web Links. Transactions of the Association for Computational Linguistics, 3: 145-156.
Choi, E.; Levy, O.; Choi, Y.; and Zettlemoyer, L. 2018. Ultra-Fine Entity Typing. In ACL, 87-96.
Cui, Z.; Kapanipathi, P.; Talamadupula, K.; Gao, T.; and Ji, Q. 2021. Type-augmented Relation Prediction in Knowledge Graphs. AAAI.
Devlin, J.; Chang, M.; Lee, K.; and Toutanova, K. 2019. BERT: Pre-training of Deep Bidirectional Transformers for Language Understanding. In NAACL-HLT, 4171-4186.
Dietterich, T. G. 1998. Approximate Statistical Tests for Comparing Supervised Classification Learning Algorithms. Neural computation, 10(7): 1895-1923.
Dror, R.; Baumer, G.; Shlomov, S.; and Reichart, R. 2018. The Hitchhiker's Guide to Testing Statistical Significance in Natural Language Processing. In ACL, 1383-1392.
Ganea, O.-E.; and Hofmann, T. 2017. Deep Joint Entity Disambiguation with Local Neural Attention. In EMNLP, 2619- 2629.
Gillick, D.; Kulkarni, S.; Lansing, L.; Presta, A.; Baldridge, J.; Ie, E.; and Garcia-Olano, D. 2019. Learning Dense Representations for Entity Retrieval. In CoNLL, 528-537.
Gillick, D.; Lazic, N.; Ganchev, K.; Kirchner, J.; and Huynh, D. 2014. Context-Dependent Fine-Grained Entity Type Tagging. arXiv preprint arXiv:1412.1820.
Giunchiglia, E.; and Lukasiewicz, T. 2020. Coherent Hierarchical Multi-Label Classification Networks. In NeurIPS, 9662-9673.
Gupta, N.; Singh, S.; and Roth, D. 2017. Entity Linking via Joint Encoding of Types, Descriptions, and Context. In EMNLP, 2681-2690.
Hoffart, J.; Yosef, M. A.; Bordino, I.; Fürstenau, H.; Pinkal, M.; Spaniol, M.; Taneva, B.; Thater, S.; and Weikum, G. 2011. Robust Disambiguation of Named Entities in Text. In EMNLP, 782-792.
Jiang, H.; Gurajada, S.; Lu, Q.; Neelam, S.; Popa, L.; Sen, P.; Li, Y.; and Gray, A. 2021. LNN-EL: A Neuro-Symbolic Approach to Short-text Entity Linking. In ACL, 775-787.
Jiang, H.; Wang, R.; Shan, S.; and Chen, X. 2019. Transferable Contrastive Network for Generalized Zero-Shot Learning. In ICCV, 9764-9773.
Kingma, D. P.; and Ba, J. 2015. Adam: A Method for Stochastic Optimization. In ICLR.
Klir, G.; and Yuan, B. 1995. Fuzzy sets and fuzzy logic, vol. 4. Prentice Hall New Jersey.
Le, P.; and Titov, I. 2018. Improving Entity Linking by Modeling Latent Relations between Mentions. In ACL, 1595-1604.
Lehmann, J.; Isele, R.; Jakob, M.; Jentzsch, A.; Kontokostas, D.; Mendes, P.N.; Hellmann, S.; Morsey, M.; van Kleef, P.; Auer, S.; and Bizer, C. 2015. DBpedia—A Large-scale, Multilingual Knowledge Base Extracted from Wikipedia. Semantic Web, 6(2): 167-195.
Lewis, M.; Liu, Y.; Goyal, N.; Ghazvininejad, M.; Mohamed, A.; Levy, O.; Stoyanov, V.; and Zettlemoyer, L. 2020. BART: Denoising Sequence-to-Sequence Pre-training for Natural Language Generation, Translation, and Comprehension. In ACL, 7871-7880.
Li, B.Z.; Min, S.; Iyer, S.; Mehdad, Y.; and Yih, W. 2020. Efficient One-Pass End-to-End Entity Linking for Questions. In EMNLP, 6433-6441.
Ling, X.; andWeld, D. S. 2012. Fine-Grained Entity Recognition. In AAAI, 94-100.
Logeswaran, L.; Chang, M.; Lee, K.; Toutanova, K.; Devlin, J.; and Lee, H. 2019. Zero-Shot Entity Linking by Reading Entity Descriptions. In ACL, 3449-3460.
Maurer, A. 2006. Bounds for Linear Multi-Task Learning. Journal of Machine Learning Research, 7(1): 117-139.
Morsey, M.; Lehmann, J.; Auer, S.; Stadler, C.; and Hellmann, S. 2012. DBpedia and the Live Extraction of Structured Data from Wikipedia. Program: Electronic Library and Information Systems.
Onoe, Y.; and Durrett, G. 2020. Fine-Grained Entity Typing for Domain Independent Entity Linking. In AAAI, 8576-8583.
Orr, L.; Leszczynski, M.; Arora, S.; Wu, S.; Guha, N.; Ling, X.; and Re, C. 2020. Bootleg: Chasing the Tail with Self-Supervised Named Entity Disambiguation. arXiv preprint arXiv:2010.10363.
Provatorova, V.; Vakulenko, S.; Bhargav, S.; and Kanoulas, E. 2021. Robustness Evaluation of Entity Disambiguation Using Prior Probes: the Case of Entity Overshadowing. arXiv preprint arXiv:2108.10949.
Raiman, J.; and Raiman, O. 2018. DeepType: Multilingual Entity Linking by Neural Type System Evolution. In AAAI, 5406-5413.
Ruder, S. 2017. An Overview of Multi-Task Learning in Deep Neural Networks. arXiv preprint arXiv: 1706.05098.
Srivastava, S. K.; Khandelwal, D.; Madan, D.; Garg, D.; Karanam, H.; and Subramaniam, L. V. 2020. Inductive Quantum Embedding. In NeurIPS.
Sun, T.; Shao, Y.; Li, X.; Liu, P.; Yan, H.; Qiu, X.; and Huang, X. 2020. Learning Sparse Sharing Architectures for Multiple Tasks. In AAAI, 8936-8943.
Tang, H.; Sun, X.; Jin, B.; and Zhang, F. 2021. A Bidirectional Multi-paragraph Reading Model for Zero-shot Entity Linking. In AAAI, 13889-13897.
Vyas, Y.; and Ballesteros, M. 2021. Linking Entities to Unseen Knowledge Bases with Arbitrary Schemas. In NAACLHLT, 834-844.
Wu, L. Blink. https://github.com/facebookresearch/blink, last accessed Jan. 14, 2021.
Wu, L.; Petroni, F.; Josifoski, M.; Riedel, S.; and Zettlemoyer, L. 2020. Scalable Zero-shot Entity Linking with Dense Entity Retrieval. In EMNLP, 6397-6407.
Yamada, I.; Shindo, H.; Takeda, H.; and Takefuji, Y. 2016. Joint Learning of the Embedding of Words and Entities for Named Entity Disambiguation. In SIGNLL, 250-259.
Bosselut, Antoine, Ronan Le Bras, and Yejin Choi. "Dynamic neuro-symbolic knowledge graph construction for zero-shot commonsense question answering." Proceedings of the 35th AAAI Conference on Artificial Intelligence (AAAI). 2021.
Yao, Zonghai, Liangliang Cao, and Huapu Pan. "Zero-shot entity linking with efficient long range sequence modeling." arXiv preprint arXiv:2010.06065 (2020).
Mell, Peter, et al., The NIST Definition of Cloud Computing, National Institute of Standards and Technology, U.S. Department of Commerce, NIST Special Publication 800-145, Sep. 2011.
Wikipedia contributors. "Radix tree." Wikipedia, The Free Encyclopedia. Wikipedia, The Free Encyclopedia, Dec. 9, 2021. Web. Jan. 14, 2022.
Wikipedia contributors. "T-norm fuzzy logics." Wikipedia, The Free Encyclopedia. Wikipedia, The Free Encyclopedia, Jun. 6, 2021. Web. Jan. 14, 2022.

* cited by examiner

ZERO-SHOT ENTITY LINKING BASED ON SYMBOLIC INFORMATION

BACKGROUND

The present application generally relates to information technology and, more particularly, to improved machine learning techniques for natural language processing.

Natural language processing (NLP) generally relates to interactions between computers and human language. NLP techniques include programming computers so that they are capable of understanding natural language (e.g., speech, documents), including contextual nuances. Entity linking is a fundamental task in the field of NLP and plays an important role in numerous applications including Knowledge Base (KB) question answering, document understanding, and dialogue systems, for example.

SUMMARY

In one embodiment of the present disclosure, techniques for zero-shot entity linking based on symbolic information are provided. An exemplary computer-implemented method includes: obtaining a knowledge graph comprising a set of entities and a training dataset comprising text samples for at least a subset of the entities in the knowledge graph; training a machine learning model to map an entity mention substring of a given sample of text to one corresponding entity in the set of entities, wherein the machine learning model is trained using a multi-task machine learning framework using symbolic information extracted from the knowledge graph; and mapping an entity mention sub string of a new sample of text to one of the entities in the set using the trained machine learning model.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform the noted method steps. Yet further, another embodiment of the present disclosure or elements thereof can be implemented in the form of a means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

An Entity Linking (EL) task maps a given natural language mention to an entity in a KB (or possibly multiple KBs). By way of example, consider the sentence "She noticed a Jaguar speeding on the highway." In this sentence, the word "Jaguar" may refer to an entity mention, and the task of mapping this mention to a real world entity from a given KB (e.g., Wikipedia, Wikidata, DBpedia, etc.) is referred to as an EL task. In the sentence above, the mention of Jaguar should generally be mapped to a type of car, as opposed to a type of cat.

Existing EL techniques mostly relate to in-domain linking, where "gold" entities of test samples are seen during training. In other words, both the KB and the entity set remain static. However, KBs are frequently evolving over time and are updated with new entities. Zero-shot Entity Linking (ZEL) extends the scope of EL, where gold entities of test samples remain unseen during training. Generally, ZEL models are based on large language models, such as a Bidirectional Encoder Representations from Transformers (BERT) model or Bidirectional and Auto-Regressive Transformer (BART) model. In general, a BERT model uses an attention mechanism (named Transformer) that learns contextual relations between words and/or sub-words in text. For example, a BERT model may process representations of words (e.g., word vectors) through a sequence of transformer blocks. The outputs of the last block in the BERT model undergo further processing based on the task being performed.

Such models, however, are computationally expensive (e.g., each additional unit of performance gain comes at an increased cost of training resources) and can also suffer from popularity bias. Popularity bias refers to the situation where models favor entities that appear more frequently in training data. For example, if mentions of the word "Jaguar" frequently refer to a car during training, then such models are likely to predict a mention of the word Jaguar to mean a car even if it means a cat in that context.

Embodiments described herein provide improved techniques for zero-shot entity linking. One or more embodiments utilize a neuro-symbolic, multi-task learning approach that boosts the performance of transformer-based models (e.g., BERT and BART) by exploiting auxiliary information about entity types. At least one embodiment includes training a model on at least a primary task and an auxiliary task simultaneously, where the primary task is an EL task and the auxiliary task is a hierarchical entity type prediction task. The auxiliary task exploits the hierarchical structure of entity types both during training and testing of the model. Such embodiments can improve the performance of a ZEL task with a significantly less amount of training data.

Figure 1:
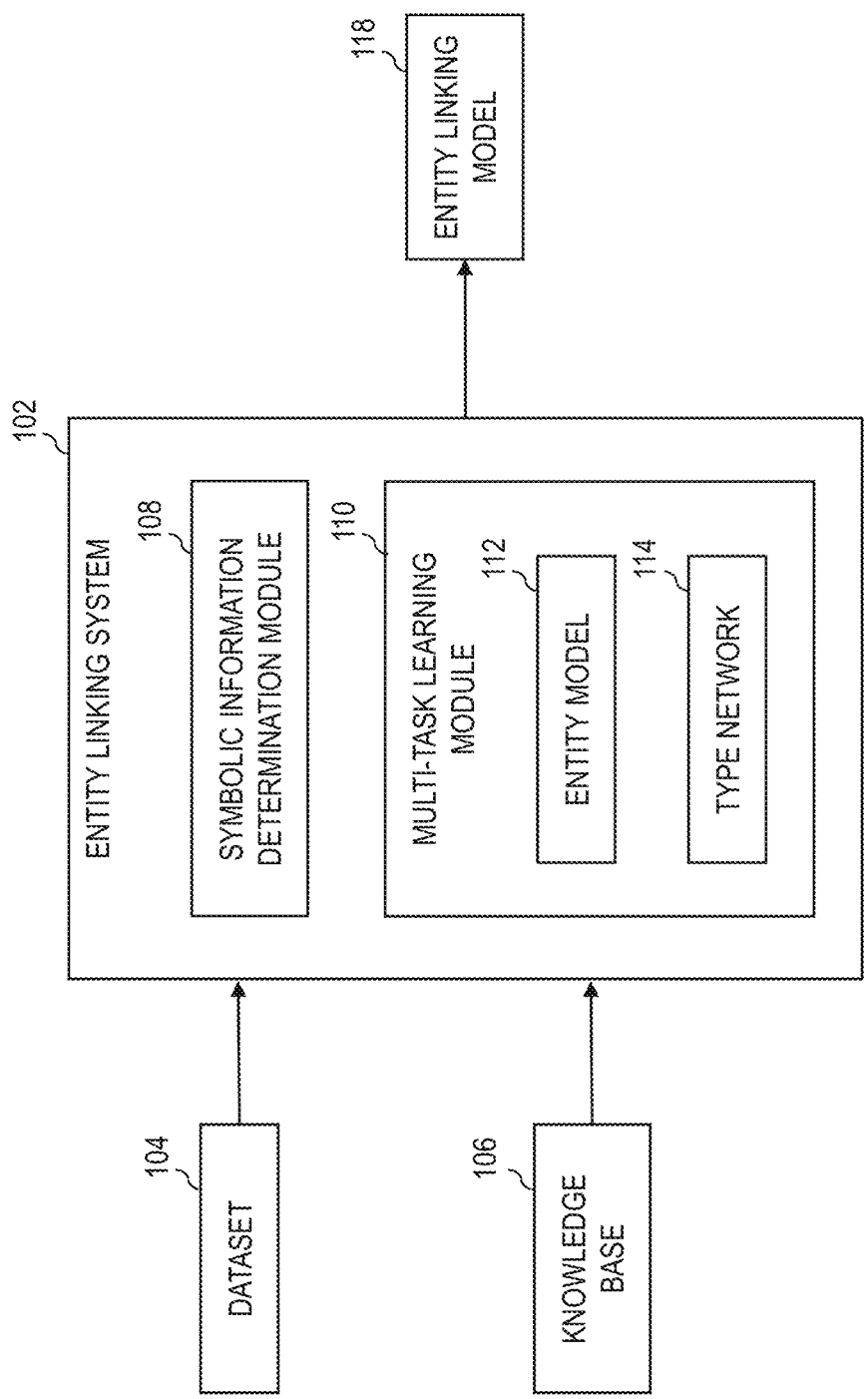
FIG. 1 is a diagram illustrating a system architecture in accordance with exemplary embodiments.

FIG. 1 is a diagram illustrating a system architecture in accordance with exemplary embodiments. By way of illustration, FIG. 1 depicts an entity linking system 102 that obtains a dataset 104 and a knowledge base (KB) 106 as input. In the FIG. 1 embodiments, the entity linking system 102 comprises a symbolic information determination module 108 and a multi-task learning module 110, which includes two submodules, namely, entity model 112 and type network 114. Generally, the entity linking system 102 trains and outputs an entity linking model 118 to link entity mentions in text to corresponding entities in the KB 106. The multi-task learning module 110 uses a combination of existing training data (e.g., unstructured data) from the dataset 104 and symbolic information from the knowledge graphs associated with the KB 106. The entity model 112, in some embodiments, performs a primary task of zero-shot entity linking (ZEL), and the type network 114 performs an auxiliary task of entity type prediction. In some embodiments, the dataset 104 includes training data, validation data, and test data, which is used to train, test, and validate the entity linking model 118, as described in further detail elsewhere herein. The entity linking model 118, in one or more embodiments, can be output of an NLP system to process NL queries, for example.

Generally, a ZEL task is akin to a cross-domain classification task where entities play the role of classes. A ZEL task includes two distinct characteristics, namely, (i) a number of classes (in both the source and the target domain) is large (e.g., Wikipedia has more than 5 million entities), and (ii) classes are not merely labels but have rich features in the form of short textual descriptions. Formally, in a ZEL task, an entity set $\varepsilon_S$ is given, which includes seen (or train) entities. Each entity $e \in \varepsilon_S$ is seen during training in the form of a linked gold entity for some training mention m. Another entity set $\varepsilon_U$ is also provided, which includes unseen (or test) entities, where $\varepsilon_s \cap \varepsilon_U = \emptyset^5$. The element level structure of these entity sets can be as follows: $\varepsilon_s = \{(e_i, d_i)\}_{i=1}^K$ and $\varepsilon_U = \{(e_i, d_i)\}_{i=(K+1)}^L$, where $e_i$ is the unique title of the entity and $d_i$ is a short textual description of the entity. The train, validation, and test set can be represented as follows:

$$D_{train}^{zel} = \{(m_i, e_i) | e_i \in \varepsilon_s\}_{i=1}^N;$$

$$D_{val}^{zel} = \{(m_j, e_j) | e_j \in \varepsilon_s\}_{j=1}^V; \text{ and}$$

$$D_{test}^{zel} = \{(m_k, e_k) | e_k \in \varepsilon_U\}_{i=1}^N,$$

In these datasets, the first part $m_i$ (and also $m_j$ and $m_k$) corresponds to the input text string along with the entity mention substring marked. The second part $e_i$ (and also $e_j$ and $e_k$) corresponds to the gold entity that must be linked to this mention. The following tuple can represent $m_i$: (left context, mention, right context). As an example, for the sentence "She noticed a Jaguar speeding on the highway", $m_i$=(She noticed a, Jaguar, speeding on the highway) and $e_i$=Jaguar_Cars (assuming the KB is Wikipedia, for example).

A typical model for a ZEL task is a scoring function: $f_{zel}$: $\mathcal{M} \times \varepsilon \mapsto \mathbb{R}$, where $\varepsilon = \varepsilon_s \cup \varepsilon_U$. For any given mention $m \in \mathcal{M}$, it induces a score for each entity $e \in \varepsilon$. The ZEL model uses these induced scores $f_{zel}(m,e)$ to rank order all the entities and top-1 entity is predicted as the final answer. The performance of a ZEL model $f_{zel}(\cdot,\cdot)$ is measured via Hits@k for k≥1. For k=1, it is also called as accuracy.

The auxiliary task (e.g., the entity type prediction (ETP) task associated with the type network 114) is performed to link an entity mention to one or more type classes from a given entity type set $T=\{t_j\}_{j=1}^{|T|}$. As an example, in the sentence, "She noticed a Jaguar speeding on the highway," the mention Jaguar may be classified into Organization and Company classes (e.g., as per DBpedia's type classes hierarchy). Training data for such a task can be given in the form of $D_{train}^{type} = \{(m_i, t_i)\}_{i=1}^N$, where $t_i = [t_{ij}]_{j=1}^{|T|}$ is a binary vector of size $|T|$, where $t_{ij}$ equals 1 if $t_j \in T$ is a valid type for the corresponding gold entity $e_i$, and 0 otherwise. A typical model for the entity type prediction is given by $f_{zel}$: $\mathcal{M} \times T \mapsto [0,1]$. For any given mention $m \in \mathcal{M}$, a probability score is induced for each type class $t_j \in T$. That is, $p(t_j|m) = f_{type}(m, t_j)$, $\forall t_j \in T$. The performance of the ETP task can be measured via a $F_1$ score computed over the predicted type set and the gold type set. A simplifying assumption can be made that the size of gold type set is known in order to avoid the need to set up a threshold.

In some embodiments, the multi-task learning module 110 may utilize a neuro-symbolic entity linking using Entities Type (NeSLET) approach, that simultaneously learns on at least the primary entity linking task and the auxiliary entity type prediction task. Both the primary and auxiliary tasks can be classification tasks for a given mention m except that: (i) the corresponding classes are different entities for the primary task and types for the auxiliary task, and (ii) the auxiliary task can be a hierarchical multi-label classification (HMLC) task. In some embodiments, the modeling assumes the probability of an entity e being the gold entity of a mention m is conditionally independent of the probability of any type $t_j$ being the valid type of the gold entity. In other words, $p(e,t|m) = p(e|m) \cdot \Pi_{j=1}^{|T|} p(t_j|m)$, $\forall e,t,m$.

In some embodiments, the following neural models for $p(e|m)$ may be implemented where $V_m$ and $V_e$ are the vector representations of mention m and entity e, respectively:

$$p(e|m) = f_{zel}(m,e) = \frac{\exp(V_m^T \cdot V_e)}{\sum_{e' \in \varepsilon} \exp(V_m^T \cdot V_{e'})} \quad (1)$$

A BERT model, in some embodiments, can be used to obtain a vector representation for both the mention m as well as the entity e. The parameters of such models may be denoted by $\theta_m$ and $\theta_e$, respectively. Accordingly, the following notation can be used $V_m$=mention-bert(m, $\theta_1$) and $V_e$=entity-bert(e,$\theta_e$).

In some embodiments, a neuro-symbolic model for $p(t_j|m)$ satisfies a path monotonicity property. More specifically, in practice, a KB organizes entity types in the form of a logical hierarchy. For example, if a path is traversed from leaf node to the root node, then the corresponding types become coarse grained. The path monotonicity property can be described as follows. Let $t_k$ be the parent node of $t_j$ in a given type hierarchy. For any mention m, type probabilities predicted by the model must satisfy the following monotonicity condition: $0 \leq p(t_j|m) \leq p(t_k|m) \leq 1$. This can be ensured by exploiting a t-norm (such as a Gödel or Łukasiewicz t-norm) typically used in the field of fuzzy logic. As per these t-norms, if $t_j$ is an internal node in the hierarchy then its probability can be computed purely in a symbolic fashion by using the probabilities assigned to its children nodes. For example, a logical OR formula (shown below) of the Gödel or Łukasiewicz t-norm can be used for this purpose, where $C_{t_j}$ denotes the set of children nodes for $t_j$:

$$p(t_j \mid m) = \begin{cases} \max_{t_k \in C_{t_j}} p(t_k \mid m) & \text{Gödel} \\ \min\left\{1, \sum_{k \in C_{t_j}} p(t_k \mid m)\right\} & \text{Łukasiewicz} \end{cases} \quad (2)$$

For the above model, the type probability of each leaf node $t_j$ in the hierarchy is computed using a neural model. More specifically, in some embodiments, vector representations $V_{t_j}$ for each leaf node are computed using a type network, which includes an initial embedding vector for each type class and, optionally, a linear layer followed by non-linearity. The parameters of this type network may be denoted by $\theta_t$, such that $V_{t_j}$=type-network($t_j,\theta_j$). The type probability of each leaf node may be given by the following formula:

$$p(t_j \mid m) = f_{type}(m, t_j) = \frac{1}{1 + \exp(-V_m^T \cdot V_{t_j})} \quad (3)$$

Consistent with equations 2 and 3, the model may be referred to as a neuro-symbolic model.

At least one embodiment includes preparing a set of data to train the neuro-symbolic model to ensure upward closure of entity types. Generally, the property of upward closure of entity types can be described as follows. If $t_j$ is given to be a type of an entity $e_i$ in a training sample, then all the nodes on the path from $t_j$ to the root node must also be considered as its valid types. By way of example, suppose a given node is determined to be a valid type for entity $e_i$, then, according to some embodiments, its type set is augmented by adding all the ancestor nodes.

Figure 2:
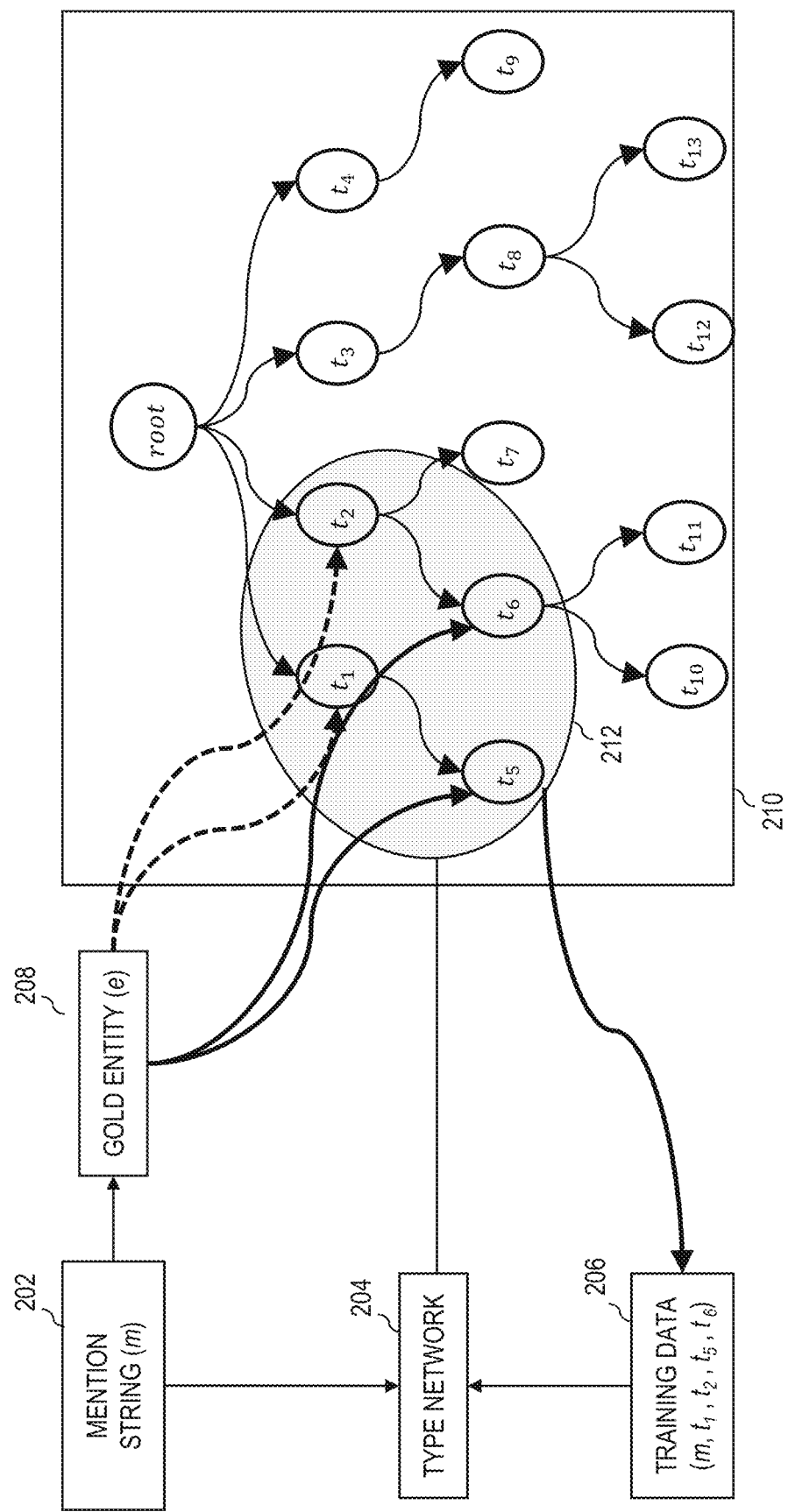
FIG. 2 is a flow diagram of an auxiliary type prediction task in accordance with exemplary embodiments.

Referring to FIG. 2, this figure shows a flow diagram of an auxiliary type prediction task in accordance with exemplary embodiments. In this example, a mention string m 202 along with a marked entity mention substring is provided to a type network 204. As an example, the mention string m 202 could be, "She noticed a Jaguar speeding on the highway," where the entity mention sub string is identified in bold text. The type network 204 is trained on training data 206, which in this example includes m, $t_1$, $t_2$, $t_5$, and $t_6$. In this example $t_1$, $t_2$, $t_5$, and $t_6$ are the types corresponding to the gold entity e (which is, "Jaguar" in the above example) for the entity mention substring in mention string m 202 as indicated by block 208. The gold entity for an entity mention is also part of the training data 206. FIG. 2 also depicts a type hierarchy 210 that includes multiple nodes corresponding to different types ($t_1$, $t_2$, ..., $t_{13}$). For the example in FIG. 3, the type set 212 corresponding to entity e comprises nodes $t_1$, $t_2$, $t_5$, and $t_6$. The type network 204, in some embodiments, generates a probability score for each node in the type set 212.

For the purpose of training the model parameters $\theta_m$, $\theta_e$, and $\theta_t$; a loss $\tilde{\ell}_{zel}$ is defined for the primary task, and a loss $\tilde{\ell}_{type}$ is defined for the auxiliary task, such that:

$$\ell_{zel}(\theta_m, \theta_e) = -\sum_{(m_i, e_i) \in D_{train}^{zel}} \log p(e_i \mid m_i)$$

$$\ell_{type}(\theta_m, \theta_t) =$$
$$-\sum_{(m_i, e_i) \in D_{train}^{zel}} \sum_{t_j \in T} \mathbb{1}_{e_i}(t_j) \log p(t_j \mid m_i) + (1 - \mathbb{1}_{e_i}(t_j)) \log(1 - p(t_j \mid m_i)).$$

In the above equation, $\mathbb{1}_{e_i}$ is an indicator variable capturing whether $t_j$ is a valid type of entity $e_i$ or not. The combined loss for the two tasks can be given by $\tilde{\ell}_{multi\_task}(\theta_m, \theta_e, \theta_t) = \tilde{\ell}_{zel}(\theta_m, \theta_e) + \alpha \tilde{\ell}_{type}(\theta_m, \theta_t)$, where $\alpha$ is a type loss weight hyperparameter. Thus, the training may be based at least in part on the following optimization problem:

$$\theta^*_m, \theta^*_e, \theta^*_t = \arg\min_{(\theta_m, \theta_e, \theta_t)} \tilde{\ell}_{multi\_task}(\theta_m, \theta_e, \theta_t) \quad (4)$$

Figure 3:
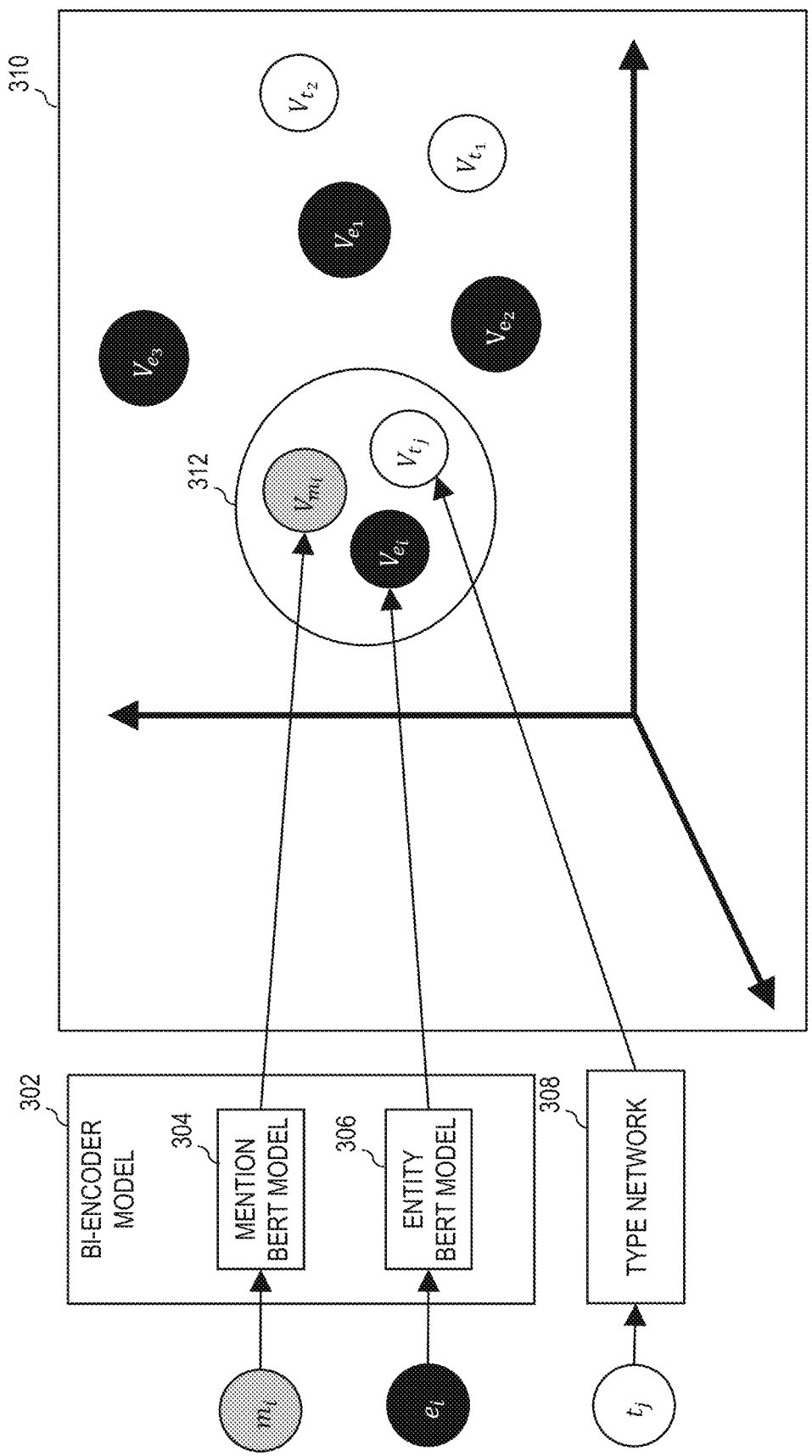
FIG. 3 is a diagram of a zero-shot entity linking multi-task architecture in accordance with exemplary embodiments.

FIG. 3 shows an example of a ZEL multi-task architecture in accordance with exemplary embodiments. More specifically, FIG. 3 depicts a bi-encoder model 302 comprising a mention BERT model 304 and an entity BERT model 306. The mention BERT model 304 processes a mention $m_i$ to generate a corresponding vector representation $V_{m_i}$ in the vector space 310, and entity BERT model 306 processes an entity $e_i$ to generate a corresponding vector representation $V_{e_i}$ in the vector space 310. The type network 308 processes $t_j$ to generate a corresponding vector representation $V_{t_j}$ in the vector space 310. In this example, the vector representations $V_{m_i}$, $V_{e_i}$, and $V_{t_j}$ are shown within the same portion 312 of the vector space 310.

Figure 4:
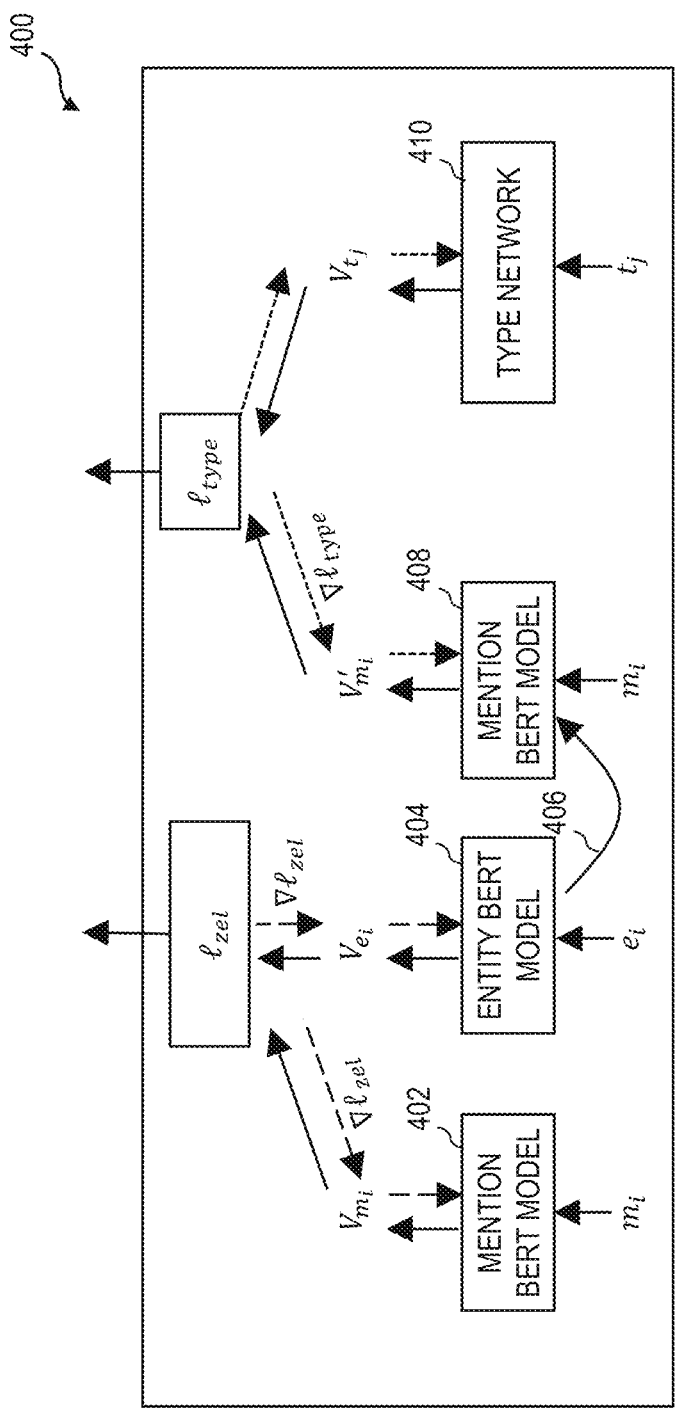
FIG. 4 is a diagram illustrating a soft parameter sharing network architecture and backpropagation scheme in accordance with exemplary embodiments.

Different strategies may be used to train the primary task and the auxiliary task. Referring now to FIG. 4, this figure depicts a soft parameter sharing network architecture and backpropagation scheme 400 in accordance with at least one embodiment. The soft parameter sharing network architecture and backpropagation scheme 400 first optimizes the loss term $\tilde{\ell}_{zel}$ alone, and then optimizes the loss term $\tilde{\ell}_{type}$. While optimizing $\tilde{\ell}_{type}$, the common parameter $\theta_m$ is initialized with the optimal value coming from the first optimization with respect to $\tilde{\ell}_{zel}$. In the example depicted in FIG. 4, BERT models are used to process mention $m_i$ and an entity $e_i$. More specifically, mention BERT model 402 processes $m_i$ to obtain $V_{m_i}$, and entity BERT model 404 processes entity $e_i$ to obtain $V_{e_i}$. The backpropagation scheme in FIG. 4 with respect to the initial optimization of the parameter $\tilde{\ell}_{zel}$ is shown using the dashed lines. The mention BERT model 408 is then initialized using based on the initial optimization as represented by arrow 406. The soft parameter sharing network architecture and backpropagation scheme 400 then optimizes $\tilde{\ell}_{type}$ based on inputs $m_i$ and $t_j$ provided to mention BERT model 408 and type network 410. The backpropagation with respect to the $\tilde{\ell}_{type}$ is shown using the dotted arrows in FIG. 4.

Figure 5:
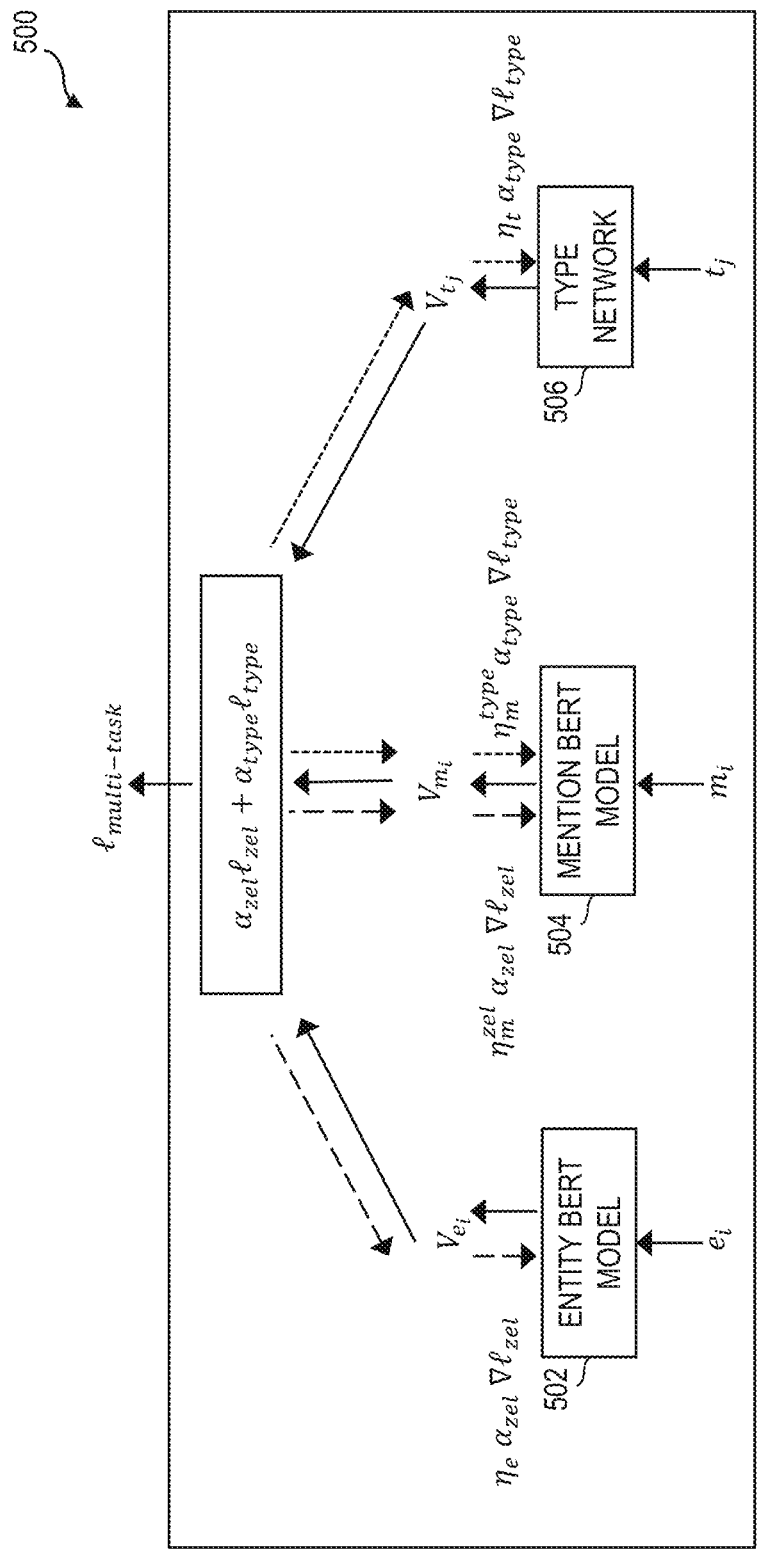
FIG. 5 shows a diagram illustrating a hard parameter sharing architecture in accordance with exemplary embodiments.

Referring to FIG. 5, this figure depicts a hard parameter sharing architecture 500 in accordance with at least one embodiment. Generally, the hard parameter sharing architecture 500 trains all the model parameters $\theta_m$, $\theta_e$, and $\theta_t$ simultaneously. The example shown in FIG. 5 also implements BERT models, namely, entity BERT model 502 and mention BERT model 504. The backpropagation scheme for the $\tilde{\ell}_{zel}$ and $\tilde{\ell}_{type}$ are shown using the dashed and dotted arrows, respectively. More specifically, the training in the hard parameter sharing architecture 500 is based on the following optimization problem: $\theta^*_m, \theta^*_e, \theta^*_t = \arg\min_{(\theta_m, \theta_e, \theta_t)} \tilde{\ell}_{multi\_task}(\theta^*_m, \theta^*_e, \theta^*_t)$. It is noted that $f_m$, $\eta_e$, and $\eta_t$ are hyperparameters corresponding to the respective learning rates of models 502, 504, and type network 506.

The examples shown in FIGS. 3-5 are shown implementing BERT models, however, this is not intended to be limiting and other models can also be used, such as other transformer-based models.

An example of an inference algorithm in accordance with one or more embodiments described herein may include the following steps:

1. For a given $m_{test}$, pick a set S of top-k entities from $\varepsilon$ by using the following ZEL-based ranking score: $S_{zel}(e|m_{test}) = p(e|m_{test}; \theta_m^{zel*}, \theta^*_e)$;
2. For each entity $e \in S$, compute type-based ranking score given by:

$$S_{type}(e|m_{test}) = \sum_{t_j \in T} \mathbb{1}_e(t_j) \cdot p(t_j|m_{test}; \theta_m^{type*}, \theta^*_t);$$

3. For each entity $e \in S$, compute a multi-task ranking score given by: $S_{multi-task} = (\beta_{zel} \cdot S_{zel}) + (\beta_{both} \cdot S_{zel} \cdot S_{type})$, where $0 \leq \beta_{zel}, \beta_{type}, \beta_{both}$ are weights of different terms and act as hyperparameters;
4. Predict the entity with highest joint score.

In embodiments where the ZEL model corresponds to a BLINK mode, it is noted that when $\beta_{zel}=1$, $\beta_{type}=\beta_{both}=0$, the model is simplified to a BLINK model. Similarly, when $\beta_{zel}=0$, $\beta_{type}=1$, and $\beta_{both}=0$, the ZEL model outputs purely type based ranking. The hyperparameters can be tuned using the validation set of the target domain, for example. The inference strategy given in the algorithm above can occasionally run into a problem if types are arranged in a hierarchy. For example, consider two entities $e_1$ and $e_2$. After type augmentation, suppose the valid type sets of $e_1$ and $e_2$ are given by the paths: root$\to t_2 \to t_6$ and root$\to t_2 \to t_6 \to t_{10}$, respectively, in the type hierarchy 210 shown in FIG. 2, for example. In this case, the type-based ranking score will always score $e_2$ higher than $e_1$. Thus, there is a bias in terms of preferring entities that have deeper penetration in the hierarchy. If $S_{type}(\cdot)$ is modified and divided by the path length, then it will favor shallow paths. To mitigate such biases, some embodiments can use the following formula: $\check{S}_{type}(e|m_{test}) = \Sigma_{path_j} p(path_j|m_{test}) \cdot p(path_k|e)$, where the sum is taken over all the paths from the root to the leaves in the type hierarchy. For each such path, a path probability of a mention $p(path_j|m_{test})$ is the mention's predicted probability for the leaf node on that path. For example, in the type hierarchy 210, there must be $p(path_1|m_{test}) = p(path_5|m_{test})$. In some embodiments, the entity's path probability $p(path_j|e)$ may be computed as follows:

1. $p(path_j|e) \gets 0$ if the leaf node of $path_j$ is not reachable from any valid type of e (e.g., in type hierarchy 210, $p(path_j|e_i)=0$, $\forall j=1 \to 6$).
2. $p(path_j|e) \gets 0$ if the leaf node of $path_j$ is reachable from some valid type (say $t_k$) of e, but a direct child of $t_k$ not lying on $path_j$ is also a valid type for e (e.g., in type hierarchy 210, assume $t_4$ has another child node $t_{14}$, and the corresponding path being $path_g$, then $p(path_g|e_i)= 0$).
3. For each of the remaining $path_j$, let $t_k$ be the deepest node which is also a valid type of e. Traverse the lower portion of $path_j$ starting from node $t_k$ up to the leaf node and multiply conditional probabilities of the edges along the way to get $p(path_j|e)$ as follows: $p(path_j|e) = \Pi_{(b,a) \in path_{j,b}}$ is descendant of $t_k p(t_b|t_a)$. The conditional probabilities $p(t_b|t_a)$ are approximated with prior probabilities from the given dataset about entities and the corresponding type set.

It is noted that a deeper type in the hierarchy is more fine-grained and generally does not have enough data for the prior probability $p(t_b|t_a)$ estimates to be reliable (e.g., a type "Company" will have more information than a type "Law Firm," which is a specific subclass of type "Company"). Accordingly, one or more embodiments of the present disclosure automatically prune the type hierarchy so that only the top-k levels of the hierarchy from the root, and restrict all calculation on these types.

Accordingly, embodiments of the multi-task learning framework described herein can train a primary task of entity and a secondary/auxiliary task of type prediction together, where the types are available from a KG. The training can be performed under the constraint of lack of training data for entities (e.g., Zero-shot entity linking). For example, techniques described herein can be used to link the entity mentions in given text to corresponding entities from one or more given knowledge bases (KB). The linked entity might not have been seen during training of the system, and the training can be performed on a constrained dataset (e.g., in data deficient environments). New entities can be onboarded without the need to retrain, and multiple types of symbolic information (e.g., entity types, knowledge facts, etc.) can be leveraged during training to compensate for the training data deficiency. In at least some embodiments, the multi-task learning framework can learn entity linking as a primary task from a given set of pairs (e.g., [mentions+context text, gold entity] pairs). The multi-task learning framework may include a separate deep learning network for each of the tasks (e.g., the primary task and the auxiliary task). Entity type prediction can be used as an auxiliary task, in some embodiments. Also, in one embodiment, entity types can be arranged in a logical (tree structure) hierarchy. Some embodiments include making an initial prediction for a given mention on the primary task of linking unseen entities, and stitching the predictions made on primary task with the predictions made on the auxiliary task to improve the prediction quality of the primary entity linking task. While stitching the probabilities of the entity types, the type hierarchy can be automatically pruned at an appropriate level in order to mitigate the data sparsity issue and thereby render high quality output.

Figure 6:
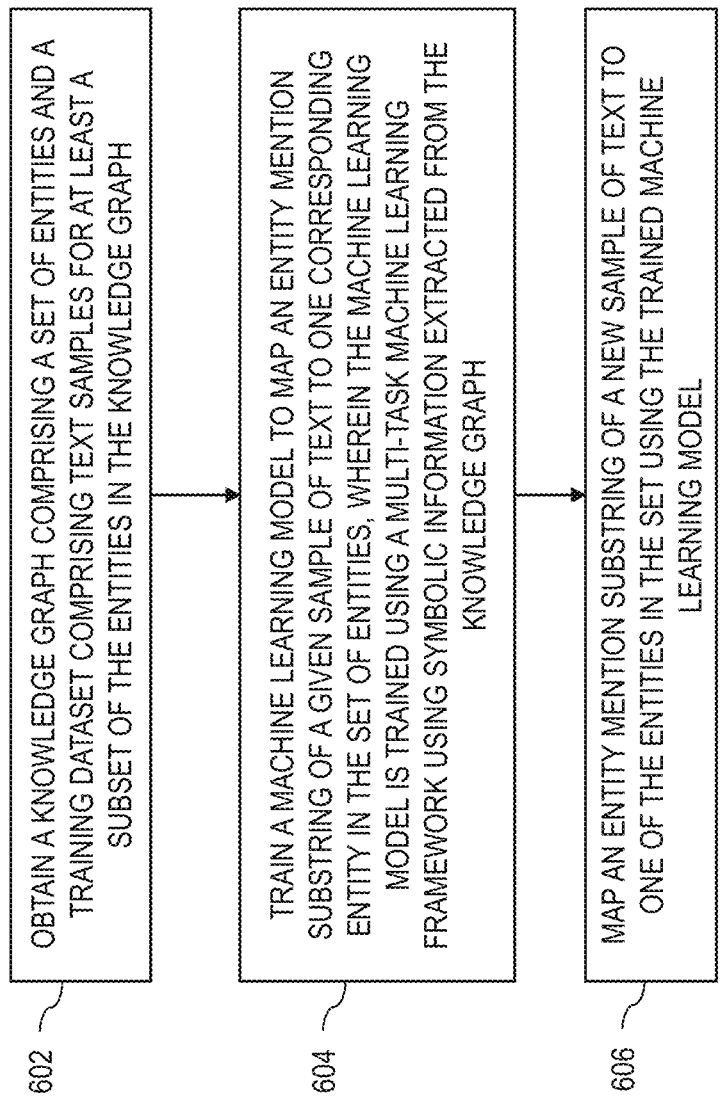
FIG. 6 is a flow diagram illustrating techniques for zero-shot entity linking in accordance with exemplary embodiments.

FIG. 6 is a flow diagram illustrating techniques for zero-shot entity linking based on symbolic information in accordance with exemplary embodiments. Step 602 includes obtaining a knowledge graph comprising a set of entities and a training dataset comprising text samples for at least a subset of the entities in the knowledge graph. Step 604 includes training a machine learning model to map an entity mention substring of a given sample of text to one corresponding entity in the set of entities, wherein the machine learning model is trained using a multi-task machine learning framework using symbolic information extracted from the knowledge graph. Step 606 includes mapping an entity mention substring of a new sample of text to one of the entities in the set using the trained machine learning model.

In some embodiments, the entity mention substring of the new sample of text is not seen during the training. The mapping may be performed without retraining the machine learning model. The multi-task machine learning framework may train the machine learning model simultaneously on at least a primary task and an auxiliary task. The primary task may include an entity linking task and the auxiliary task may include an entity type prediction task. The training may include: generating predictions for the primary task and for secondary task; and stitching the generated predictions for the primary task with the generated predictions of the secondary task to improve at least one performance metric corresponding to the primary task of the learning model. The stitching may include pruning a hierarchy of entity types at a specified level. In some embodiments, the appropriate level to be pruned may be determined using a validation dataset. A given text sample in the training dataset may include a mention of at least one entity in the subset of entities and text corresponding to a context of the mention. The symbolic information may include multiple entity types. The multiple entity types may be arranged in a logical hierarchy.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
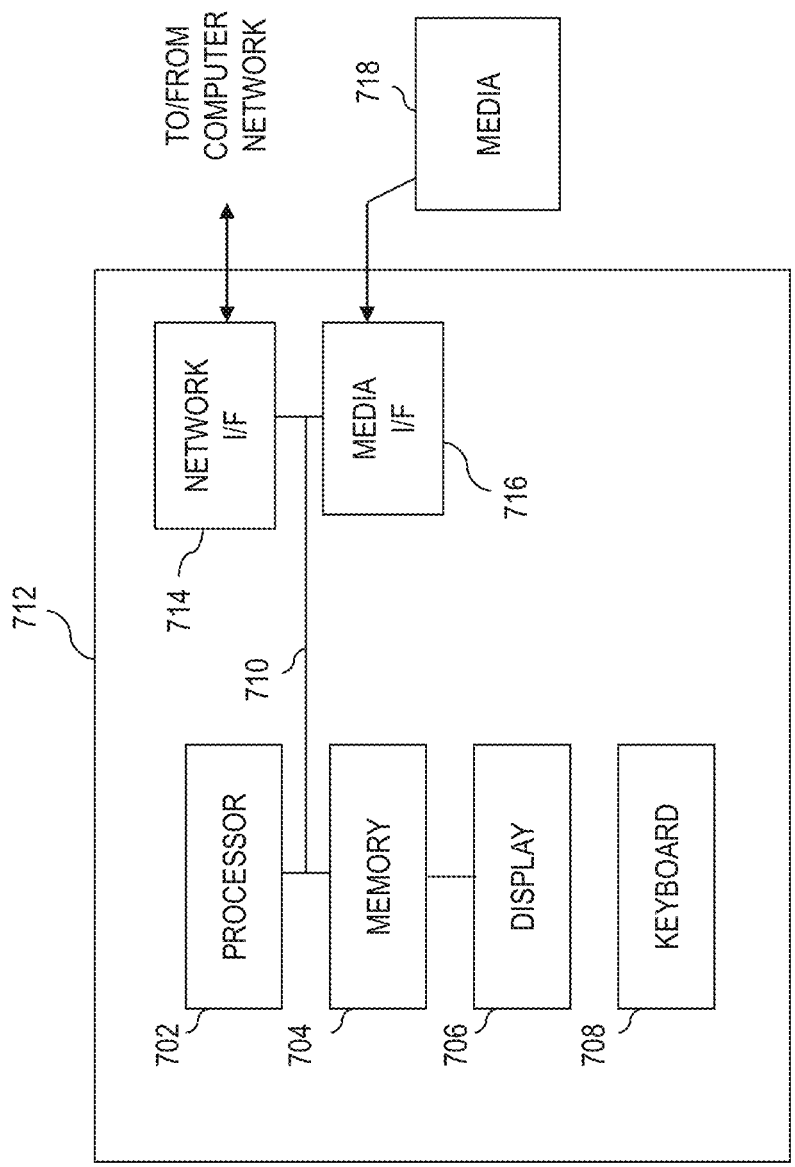
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
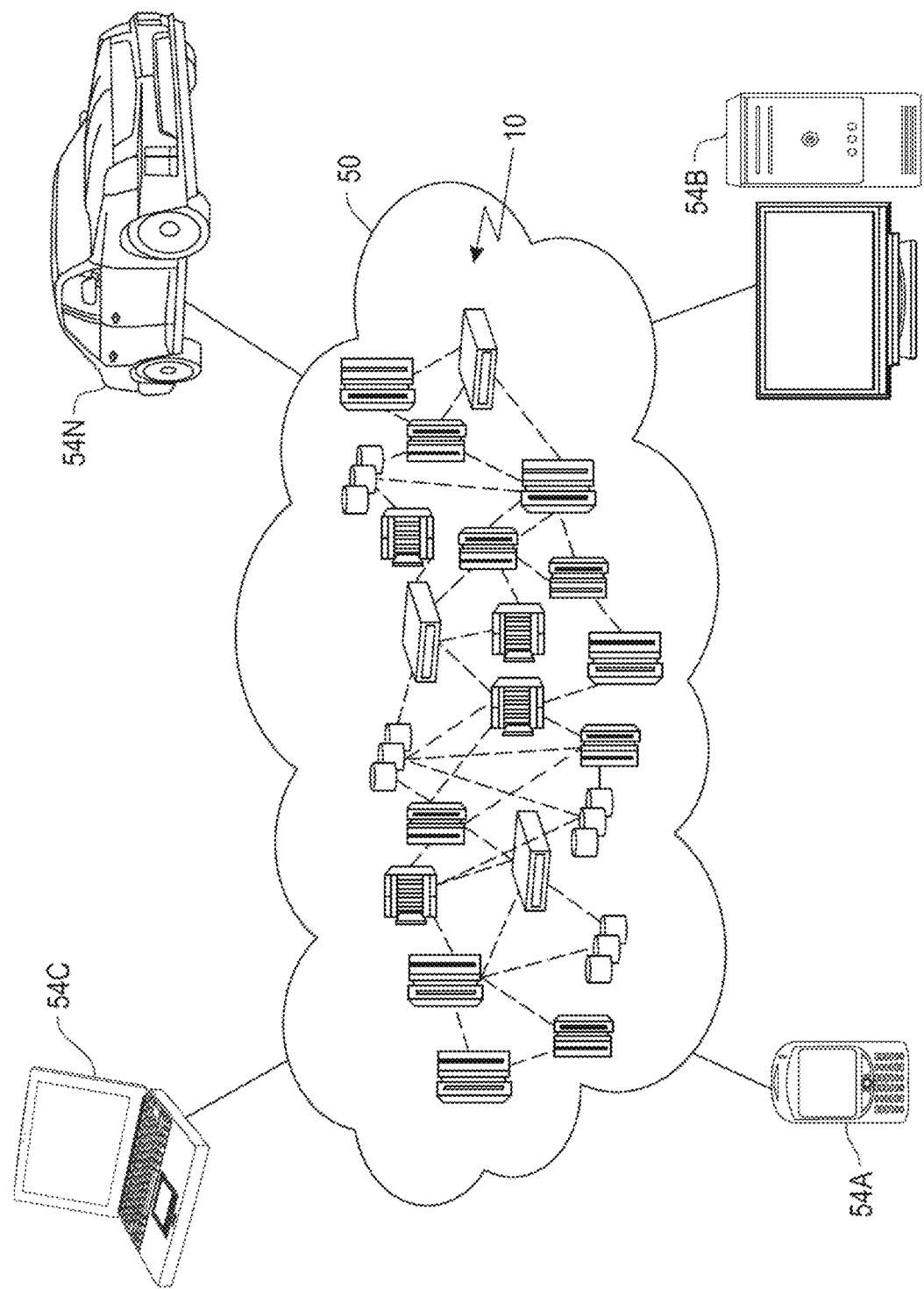
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
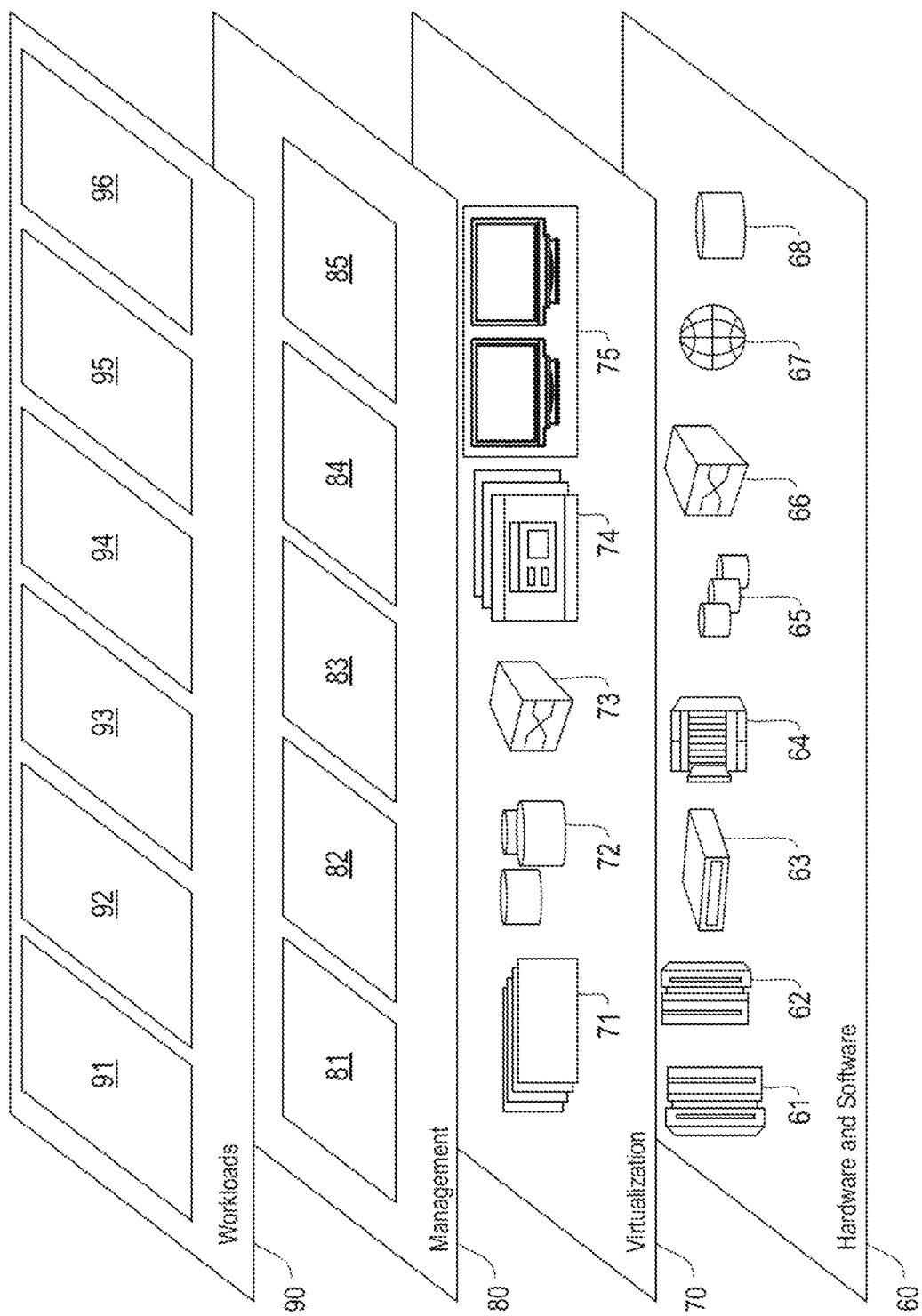
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and zero-shot entity linking 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, performing an auxiliary type prediction task with limited amounts of training data. At least some embodiments can improve the quality of entity linking models by leveraging symbolic information and enable new entities to onboard without the need to retrain the model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a knowledge graph comprising a set of entities and a training dataset comprising text samples for at least a subset of the entities in the knowledge graph;
    training a machine learning model to map an entity mention substring of a given sample of text to one corresponding entity in the set of entities, wherein the machine learning model is trained using a multi-task machine learning framework using symbolic information extracted from the knowledge graph; and
    mapping an entity mention substring of a new sample of text to one of the entities in the set using the trained machine learning model;
    wherein the method is carried out by at least one computing device.

2. The computer-implemented method of claim 1, wherein the entity mention substring of the new sample of text is not seen during the training.

3. The computer-implemented method of claim 2, wherein the mapping is performed without retraining the machine learning model.

4. The computer-implemented method of claim 1, wherein the multi-task machine learning framework trains the machine learning model simultaneously on at least a primary task and an auxiliary task.

5. The computer-implemented method of claim 4, wherein the primary task comprises an entity linking task and the auxiliary task comprises an entity type prediction task.

6. The computer-implemented method of claim 4, wherein the training comprises:
    generating predictions for the primary task and for secondary task; and
    stitching the generated predictions for the primary task with the generated predictions of the secondary task to improve at least one performance metric corresponding to the primary task of the learning model.

7. The computer-implemented method of claim 6, wherein the stitching comprises pruning a hierarchy of entity types at a specified level.

8. The computer-implemented method of claim 1, wherein a given text sample in the training dataset comprises a mention of at least one entity in the subset of entities and text corresponding to a context of the mention.

9. The computer-implemented method of claim 1, wherein the symbolic information comprises multiple entity types.

10. The computer-implemented method of claim 9, wherein the multiple entity types are arranged in a logical hierarchy.

11. The computer-implemented method of claim 1, wherein software is provided as a service in a cloud environment.

12. A computer program product comprising a computer readable storage medium having program instructions embodied therewith, the program instructions executable by a computing device to cause the computing device to:
    obtain a knowledge graph comprising a set of entities and a training dataset comprising text samples for at least a subset of the entities in the knowledge graph;
    train a machine learning model to map an entity mention substring of a given sample of text to one corresponding entity in the set of entities, wherein the machine learning model is trained using a multi-task machine learning framework using symbolic information extracted from the knowledge graph; and
    map an entity mention substring of a new sample of text to one of the entities in the set using the trained machine learning model.

13. The computer program product of claim 12, wherein the entity mention substring of the new sample of text is not seen during the training.

14. The computer program product of claim 13, wherein the mapping is performed without retraining the machine learning model.

15. The computer program product of claim 12, wherein the multi-task machine learning framework trains the machine learning model simultaneously on at least a primary task and an auxiliary task.

16. The computer program product of claim 15, wherein the primary task comprises an entity linking task and the auxiliary task comprises an entity type prediction task.

17. The computer program product of claim 15, wherein the training comprises:
generating predictions for the primary task and for secondary task; and
stitching the generated predictions for the primary task with the generated predictions of the secondary task to improve at least one performance metric corresponding to the primary task of the learning model.

18. The computer program product of claim 12, wherein the symbolic information comprises multiple entity types.

19. The computer program product of claim 18, wherein the multiple entity types are arranged in a logical hierarchy.

20. A system comprising:
a memory configured to store program instructions;
a processor operatively coupled to the memory to execute the program instructions to:
obtain a knowledge graph comprising a set of entities and a training dataset comprising text samples for at least a subset of the entities in the knowledge graph;
train a machine learning model to map an entity mention substring of a given sample of text to one corresponding entity in the set of entities, wherein the machine learning model is trained using a multi-task machine learning framework using symbolic information extracted from the knowledge graph; and
map an entity mention substring of a new sample of text to one of the entities in the set using the trained machine learning model.

\* \* \* \* \*